United States Patent
Ohmori et al.

(10) Patent No.: US 11,976,919 B2
(45) Date of Patent: May 7, 2024

(54) TARGET INSTALLATION APPARATUS AND TARGET INSTALLATION METHOD USING THE SAME

(71) Applicant: HONDA MOTOR CO., LTD., Tokyo (JP)

(72) Inventors: Eiji Ohmori, Tokyo (JP); Kazuki Matsumoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 152 days.

(21) Appl. No.: 17/576,122

(22) Filed: Jan. 14, 2022

(65) Prior Publication Data
US 2022/0228860 A1    Jul. 21, 2022

(30) Foreign Application Priority Data
Jan. 20, 2021    (JP) .................. 2021-007354

(51) Int. Cl.
*G01B 11/275* (2006.01)
*G01B 11/27* (2006.01)

(52) U.S. Cl.
CPC ........ *G01B 11/2755* (2013.01); *G01B 11/272* (2013.01); *G01B 2210/12* (2013.01)

(58) Field of Classification Search
CPC .............. G01B 11/2755; G01B 11/272; G01B 2210/12; G01B 21/26; G01B 2210/10;
(Continued)

(56) References Cited

U.S. PATENT DOCUMENTS 5,675,515 A * 10/1997 January ................ G01B 11/275
356/139.09
5,809,658 A * 9/1998 Jackson ............. G01B 11/2755
33/203.18
(Continued)

FOREIGN PATENT DOCUMENTS

CN    101103245 A  *  1/2008  ............. G01B 21/26
CN    101103245 A     1/2008
(Continued)

OTHER PUBLICATIONS

Office Action dated Aug. 25, 2023, issued in counterpart CN Application No. 202111647933.6, with English Translation. (14 pages).

*Primary Examiner* — Yaritza Guadalupe-McCall

(57) ABSTRACT

A target installation apparatus for installing a target for aiming equipment mounted on a vehicle comprises: a reference point setting unit configured to set vehicle-side reference points on both exterior sides in a vehicle width direction of the vehicle, wherein the reference point setting unit includes: a rod-shaped member that extends in the vehicle width direction with respect to the vehicle and that is arrangeable to abut both tires of the vehicle; and a pair of reference point forming units that are attached to the rod-shaped member to be positioned on both the exterior sides of the vehicle in the case of being arranged with respect to the vehicle and that include marks formed to respectively indicate the reference points, and wherein the pair of reference point forming units respectively include moving portions that move the reference points in a front-and-rear direction of the vehicle.

9 Claims, 10 Drawing Sheets

(58) Field of Classification Search
CPC .................. G01S 7/403; G01S 7/4086; G01S 2013/93271; G01S 13/931; G01S 7/4972; G01S 17/931
See application file for complete search history.

(56) References Cited

U.S. PATENT DOCUMENTS

| | | | | |
|---|---|---|---|---|
| 6,148,528 | A * | 11/2000 | Jackson | G01B 11/2755 33/203.18 |
| 7,089,776 | B2 * | 8/2006 | Dale, Jr. | G01B 11/275 33/203.18 |
| 7,382,913 | B2 * | 6/2008 | Dorranc | G06T 7/70 382/151 |
| 7,538,864 | B2 * | 5/2009 | Golab | G01C 11/025 356/139.09 |
| 7,661,198 | B2 | 2/2010 | Hara | |
| 7,774,946 | B2 * | 8/2010 | Boni | G01B 11/2755 33/203.18 |
| 8,244,024 | B2 * | 8/2012 | Dorrance | G01B 11/2755 382/151 |
| 8,875,407 | B2 * | 11/2014 | Stieff | G01B 11/2755 356/139.09 |
| 9,778,030 | B2 * | 10/2017 | McClenahan | G01B 11/2755 |
| 11,243,074 | B2 * | 2/2022 | DeBoer | G01B 11/275 |
| 11,702,045 | B2 * | 7/2023 | Jackson, Jr. | B60S 5/00 33/288 |
| 2009/0000133 | A1 | 1/2009 | Hara | |
| 2022/0228860 | A1 * | 7/2022 | Ohmori | G01S 7/403 |
| 2023/0001996 | A1 * | 1/2023 | Matsumoto | B62D 65/16 |
| 2023/0243676 | A1 * | 8/2023 | Lawrence | H04N 17/002 73/1.01 |

FOREIGN PATENT DOCUMENTS

| | | | | |
|---|---|---|---|---|
| CN | 101103245 B | * | 11/2010 | ............ G01B 21/26 |
| CN | 202547955 U | | 11/2012 | |
| CN | 104792555 A | * | 7/2015 | |
| CN | 104792555 A | | 7/2015 | |
| CN | 104792555 B | * | 5/2018 | |
| DE | 102012005164 A1 | | 9/2013 | |
| JP | 2019-051786 A | | 4/2019 | |
| WO | 2021/005578 A1 | | 1/2021 | |
| WO | WO-2021005578 A1 | * | 1/2021 | ............ B66F 7/065 |

* cited by examiner

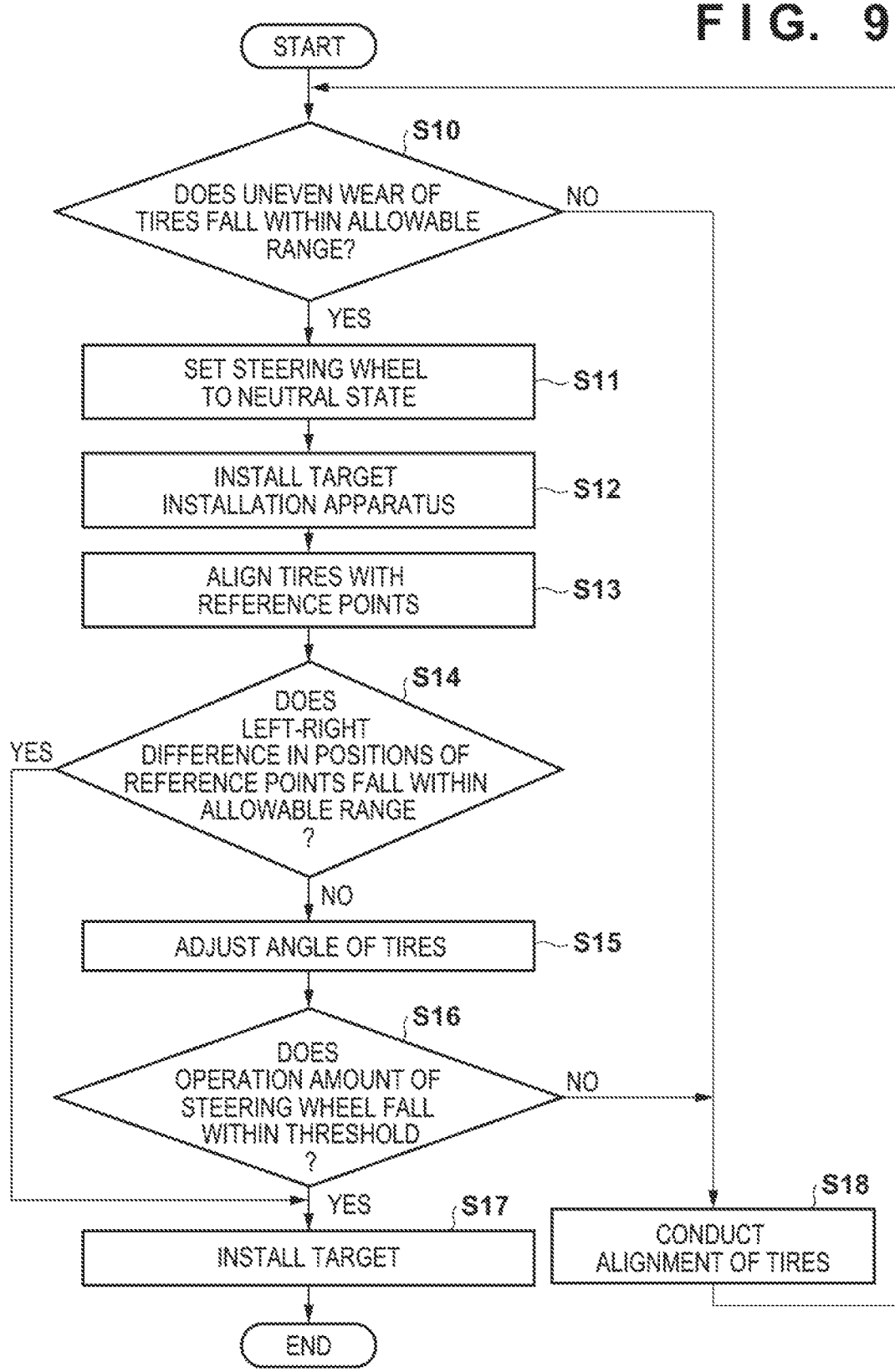

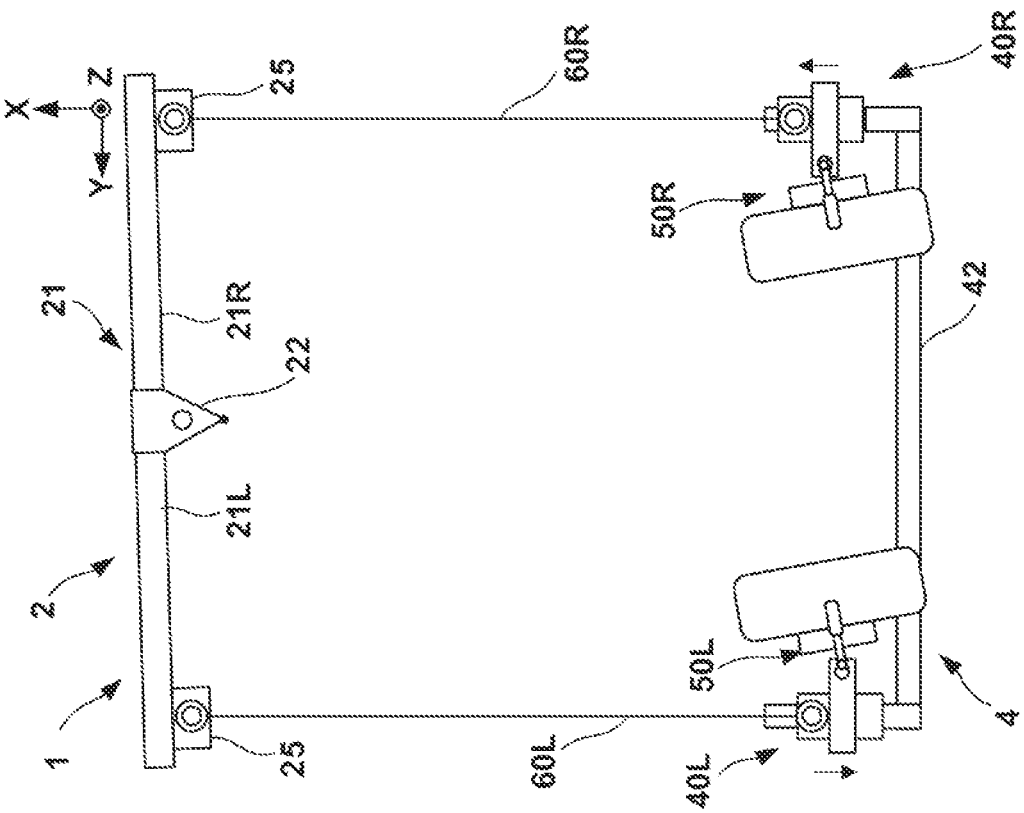
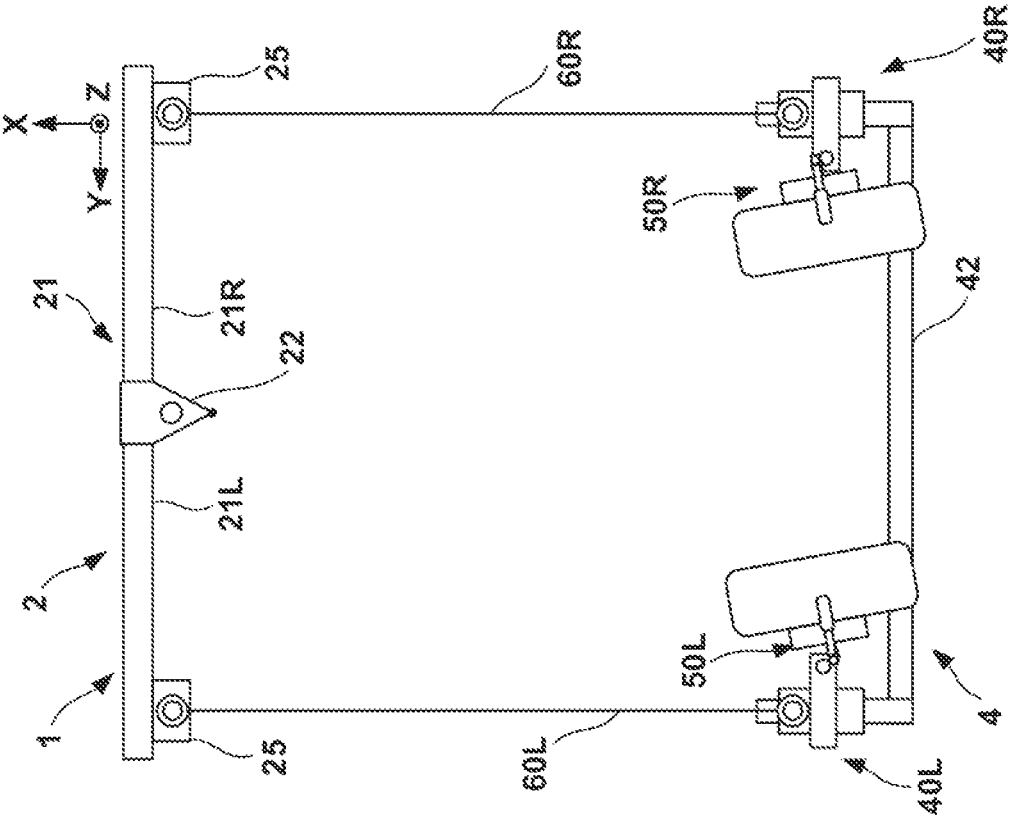

TARGET INSTALLATION APPARATUS AND TARGET INSTALLATION METHOD USING THE SAME

CROSS-REFERENCE TO RELATED APPLICATION(S)

This application claims priority to and the benefit of Japanese Patent Application No. 2021-007354 filed on Jan. 20, 2021, the entire disclosure of which is incorporated herein by reference.

BACKGROUND OF THE INVENTION

Field of the Invention

The present invention relates to a target installation apparatus and a target installation method using the same.

Description of the Related Art

In order to adjust equipment such as light and external sensors mounted on an automobile, conventionally, a target for aiming is installed ahead or behind the vehicle, in some cases. Japanese Patent Laid-Open No. 2019-051786 discloses a method for positioning the target for aiming to be installed ahead the vehicle.

SUMMARY OF THE INVENTION

According to one embodiment of the present invention, a target installation apparatus for installing a target for aiming equipment mounted on a vehicle, comprises: a reference point setting unit, in a case of being arranged with respect to the vehicle, configured to set vehicle-side reference points on both exterior sides in a vehicle width direction of the vehicle, wherein the reference point setting unit includes: a rod-shaped member that extends in the vehicle width direction with respect to the vehicle and that is arrangeable to abut both tires of the vehicle; and a pair of reference point forming units that are attached to the rod-shaped member to be positioned on both the exterior sides of the vehicle in the case of being arranged with respect to the vehicle and that include marks formed to respectively indicate the reference points, and wherein the pair of reference point forming units respectively include moving portions that move the reference points in a front-and-rear direction of the vehicle while being arranged with respect to the vehicle.

According to another embodiment of the present invention, a target installation method using the target installation apparatus according to the above embodiment, comprises: arranging the reference point setting unit with respect to the vehicle; aligning center positions of the tires with positions of the reference points in the front-and-rear direction, by moving the moving portions; and adjusting angles of the tires by operating a steering wheel of the vehicle such that a positional relationship of the reference points in the front-and-rear direction satisfies a predetermined condition.

BRIEF DESCRIPTION OF THE DRAWINGS

FIG. 9 is a flowchart illustrating an example of a target installation method using the target installation apparatus;

FIG. 10A is a view illustrating states of the vehicle and the target installation apparatus, when the target installation method of FIG. 9 is performed;

FIG. 10B is a view illustrating states of the vehicle and the target installation apparatus, when the target installation method of FIG. 9 is performed;

DESCRIPTION OF THE EMBODIMENTS

Figure 1:
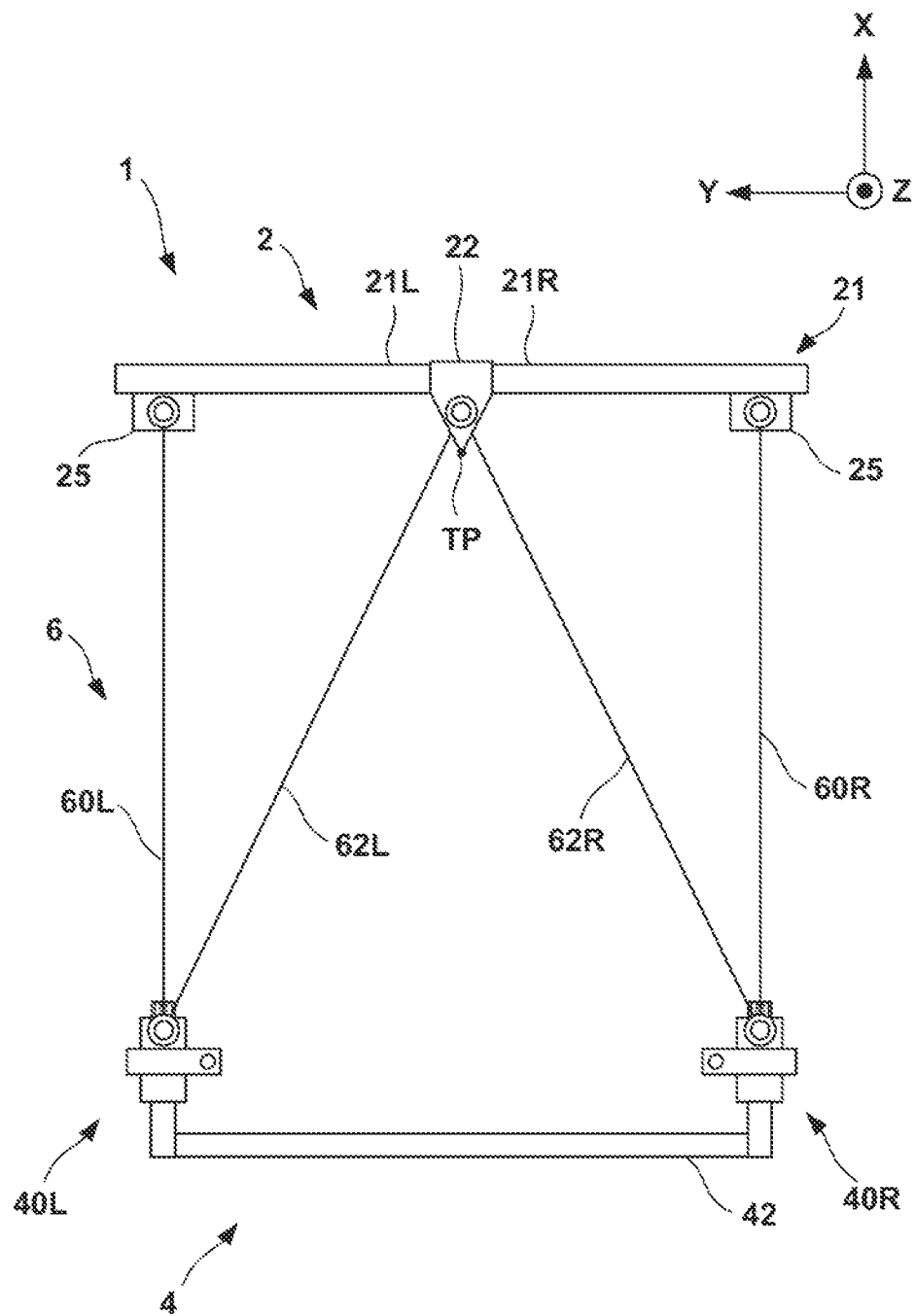
FIG. 1 is a plan view schematically illustrating a target installation apparatus according to an embodiment.

In installing a target for aiming, by the way, a reference point on the vehicle side is determined with a tire as a reference, in some cases. In such cases, accuracy of the installation position of the target may be affected depending on a turning state of the tire, an attachment position to a vehicle body or an angle of the tire, or the like.

In embodiments of the present invention, a technique for improving installation accuracy of a target for aiming is provided.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each drawing, X direction indicates a front-and-rear direction of a vehicle V, Y direction indicates a vehicle width direction of the vehicle V, and Z direction indicates an up-and-down direction. Further, in the present specification, expressions such as front/rear, left/right (lateral side), and up/down each indicate a relative positional relationship with the vehicle body as a reference. For example, expressions such as front and forward correspond to +X direction, and expressions such as rear and rearward correspond to −X direction. Furthermore, for example, expressions such as left and leftward correspond to +Y direction, and expressions such as right and rightward correspond to −Y direction. Similarly, expressions such as interior side of the vehicle body and exterior side of the vehicle body (interior and exterior of the vehicle body) each indicate a relative positional relationship with the vehicle body as a reference.

<Overview of Target Installation Apparatus>

Figure 2:
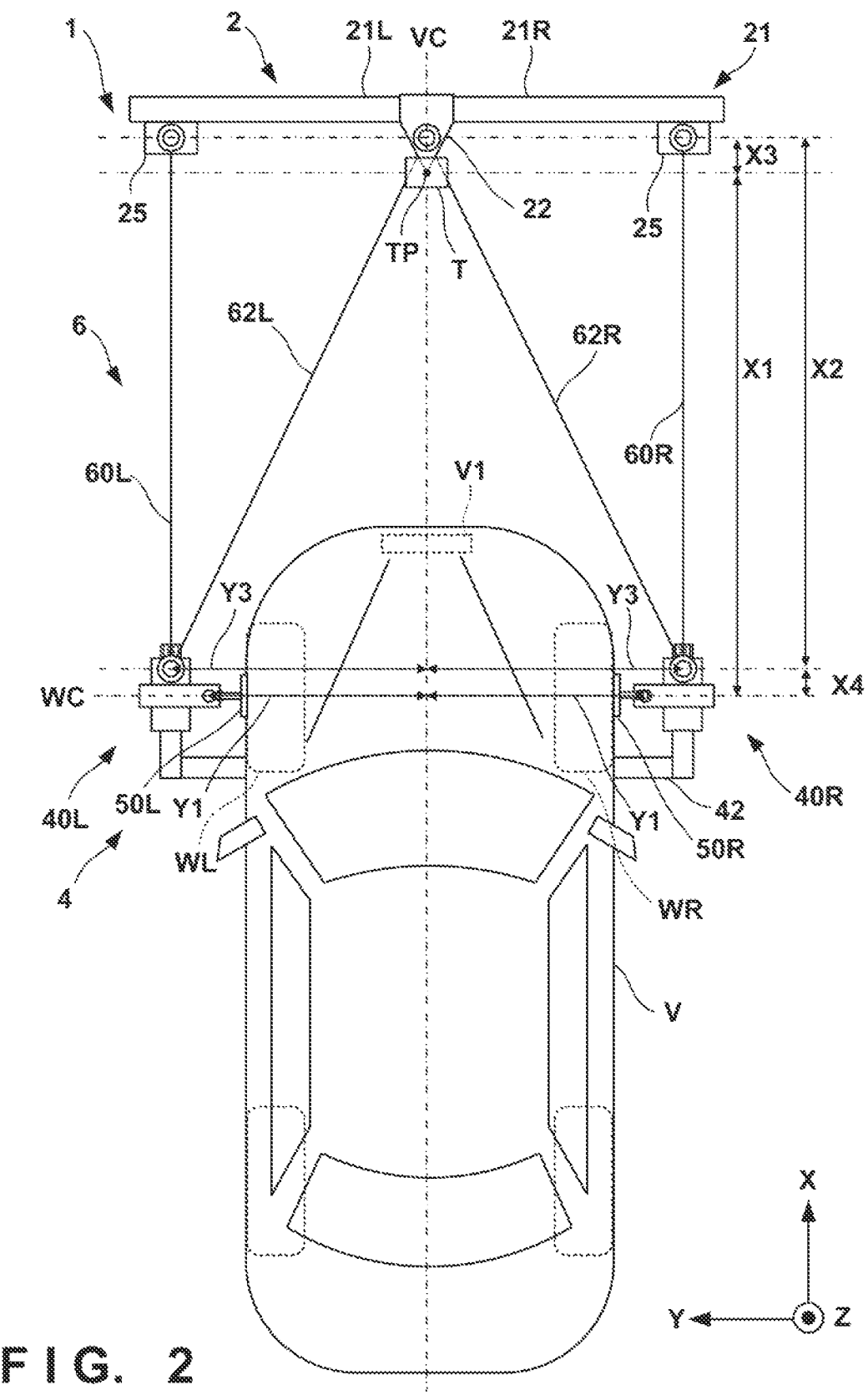
FIG. 2 is a diagram illustrating a state in which the target installation apparatus and a target of FIG. 1 are arranged with respect to a vehicle.

FIG. 1 is a plan view schematically illustrating a target installation apparatus 1 according to a first embodiment. FIG. 2 is a diagram illustrating a state in which the target installation apparatus 1 and a target T in FIG. 1 are arranged with respect to a vehicle V. The target installation apparatus 1 is an apparatus for installing the target T at a predetermined position in order to adjust equipment such as light and external sensors mounted on the vehicle V. Hereinafter, a description will be given with regard to an example of a case where the target T for aiming at a radar V1 as an external sensor mounted on a front part of the vehicle V is installed. However, the target installation can also be used for adjustments of other external sensors such as a camera, a LiDAR, and the like, and can also be used for adjustment of equipment in a rear part of the vehicle V by being arranged behind the vehicle V.

The target installation apparatus 1 includes a front bar member 2, a reference member 4, and a connection unit 6. The front bar member 2 and the reference member 4 each extending in the vehicle width direction, are provided to be spaced apart from each other in the front-and-rear direction, and are connected with each other by the connection unit 6. Then, by aligning reference points 400L and 400R formed on the reference member 4 respectively with predetermined positions of the vehicle V, a target point TP formed on the front bar member 2 is aligned with a position that satisfies a predetermined condition for adjusting the equipment.

The predetermined condition can be set as appropriate. However, for example, the target point TP may be located on an extension line of a center line VC of the vehicle V, and may have a predetermined distance of 1 meter to 10 meters in the front-and-rear direction from the wheel centers of front wheels. Note that the target point TP may be offset in the width direction from the center line VC of the vehicle V.

<Front Bar Member>

Figure 3:
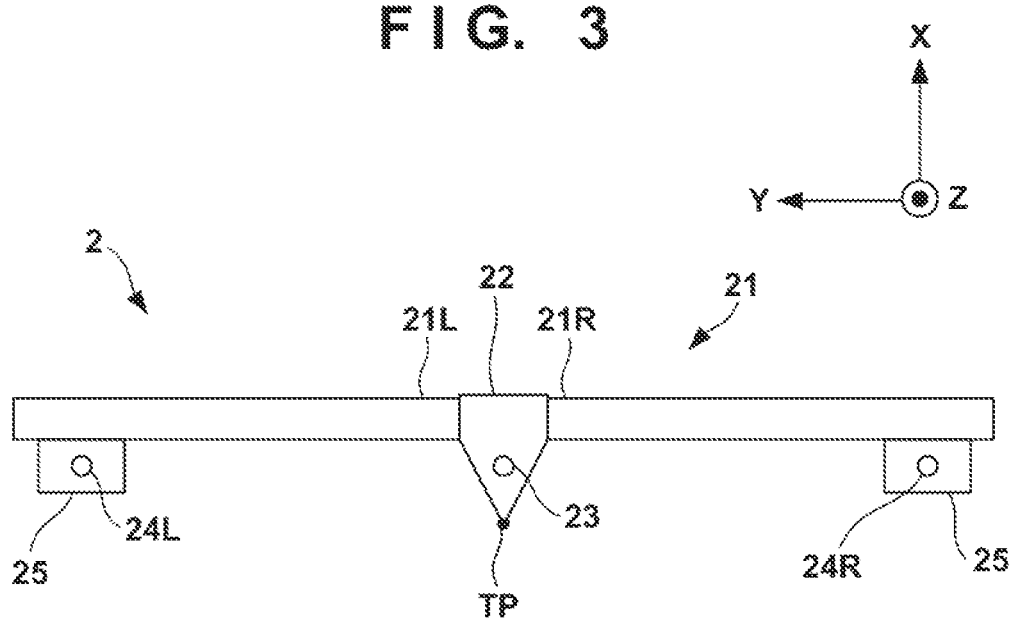
FIG. 3 is a view illustrating a configuration example of a front bar member.

Reference is also made to FIG. 3. FIG. 3 is a diagram illustrating a configuration example of the front bar member 2. The front bar member 2 is a rod-shaped member serving as a target setting unit provided with the target point TP indicating an installation position of the target T. In arranging the front bar member 2 with respect to the vehicle V, it is possible to arrange it to extend over the vehicle width direction ahead or behind the vehicle V. The front bar member 2 includes a main body 21, a point forming member 22 that forms the target point TP, and pins 23, 24L, and 24R engageable with a connection member of the connection unit 6 (to be described later).

The main body 21 is a member constituting the framework of the front bar member 2, is made up of, for example, a metal material, and can have a hollow and rectangular cross-sectional shape. In the present embodiment, the main body 21 is divided into left and right parts with the point forming member 22 interposed therebetween, and includes a left-side part 21L and a right-side part 21R. However, the main body 21 may be integrally molded. Note that the material, shape, or the like of the front bar member 2 is not limited to the above description. Other materials, shapes, and the like can also be adopted.

The point forming member 22 is a member that defines the position of the target point TP. In the present embodiment, the point forming member 22 is provided to be interposed between the left-side part 21L and the right-side part 21R of the main body 21. As an example, the point forming member 22 may include a convex portion engageable with the hollow part of the main body 21, and may be attached to the main body 21 by engaging with the main body 21. Further, for example, at least one of the left-side part 21L and the right-side part 21R may have a convex-shaped part, and the point forming member 22 may include a recess to be engaged with the convex-shaped part. Further, for example, the point forming member 22 may be provided so that the point forming member 22 sandwiches the main body 21 from above, instead of being interposed between the left-side part 21L and the right-side part 21R. However, the point forming member 22 is interposed between the left-side part 21L and the right-side part 21R, so that the position of the point forming member 22 in the width direction can be determined with accuracy.

In the present embodiment, the point forming member 22 includes a triangular part with a main body 21 side as a base and a reference member 4 side as an apex, and the apex of the triangle is defined as the target point TP. Therefore, by aligning the target T with the vertex of the triangle, it is possible to install the target T to satisfy a predetermined condition for adjusting the equipment.

The pins 23, 24L, and 24R engage connection members 60L, 60R, 62L, and 62R, to be described later, of the connection unit 6 with the front bar member 2. More specifically, the pin 23 engages the connection members 62L and 62R, the pin 24L engages the connection member 60L, and the pin 24R engages the connection member 60R each with the front bar member 2. That is, the pins 23, 24L, and 24R are attachment members, of the connection unit 6, on the front bar member 2 side. In the present embodiment, the pins 23, 24L, and 24R are provided to extend upward from a base portion 25 extending from the main body 21 to the reference member side. The base portion 25 is, for example, a metal plate, and can be fixed to the main body 21 by welding or the like.

In addition, in the present embodiment, the connection members 62L and 62R are engaged by the common pin 23 on the front bar member 2 side. Accordingly, a triangle is formed with pins 408L and 408R on the reference member 4 side and the pin 23. Therefore, in a case where the pins 408L and 408R, and the pin 23 are respectively connected by the connection members 62L and 62R, the position of the pin 23 is determined at one point. In the present embodiment, the pin 23 is provided on the extension line of the center line VC of the vehicle V. Accordingly, the distances from the pin 23 to the pins 408L and 408R on the reference member 4 side are equal to each other, so that the lengths of the connection members 62L and 62R can be made in common.

<Reference Member>

Figure 4:
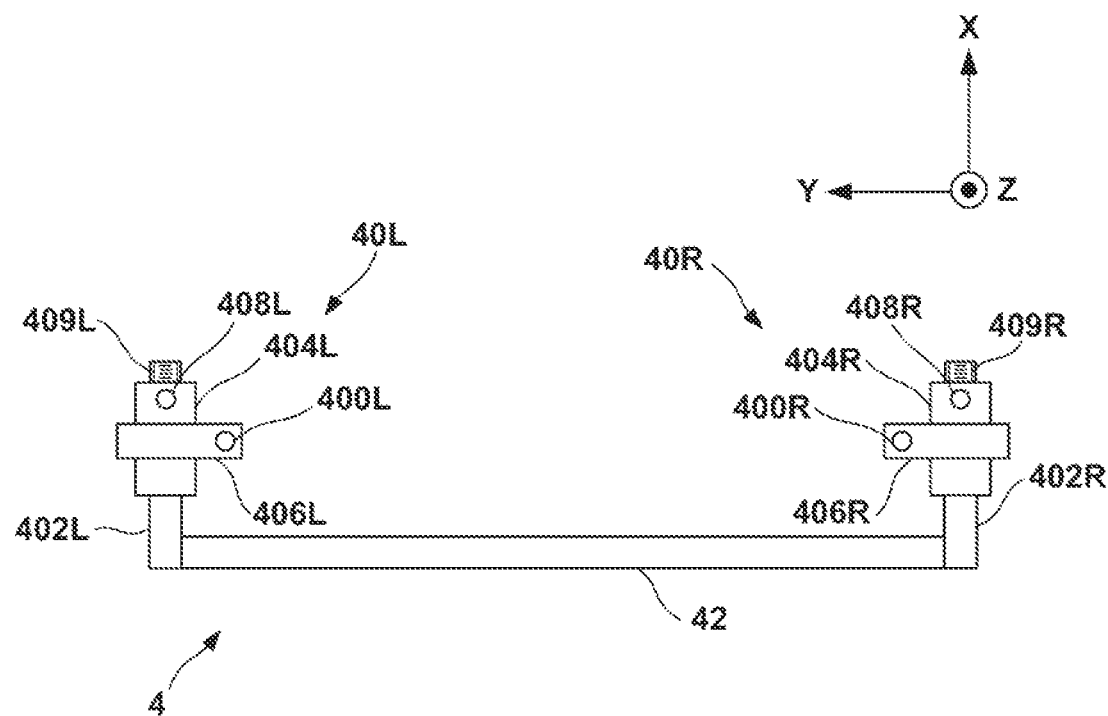
FIG. 4 is a plan view illustrating a configuration example of a reference member.
Figure 5A:
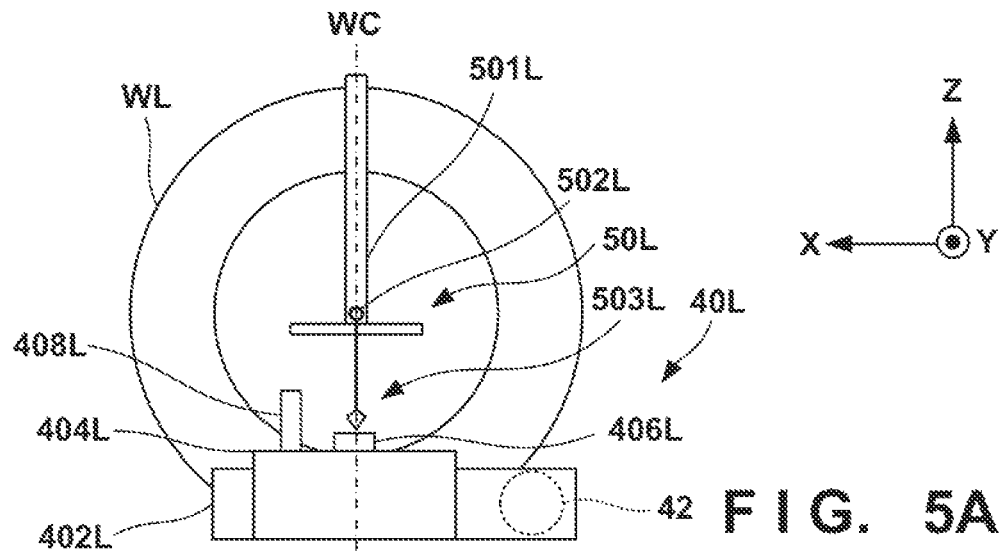
FIG. 5A is a view schematically illustrating a reference point forming unit.
Figure 5B:
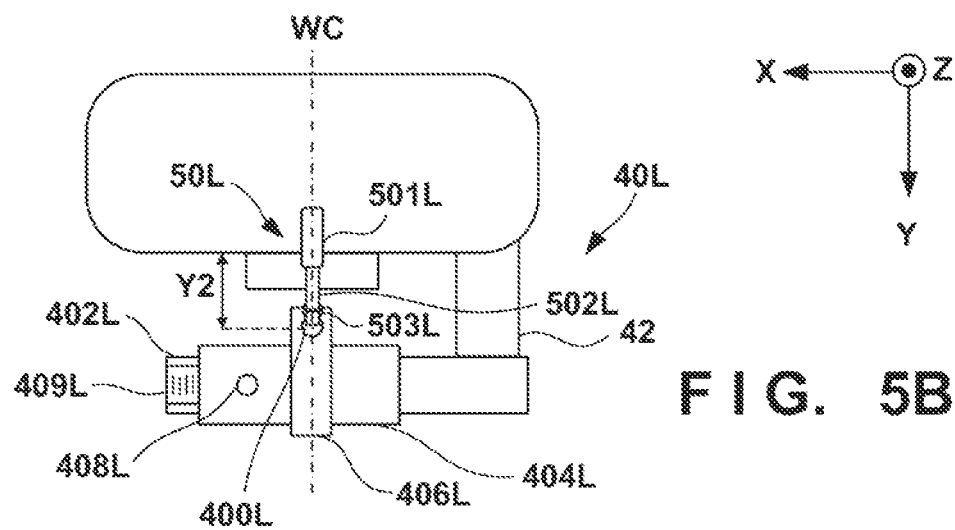
FIG. 5B is a view schematically illustrating the reference point forming unit.
Figure 5C:
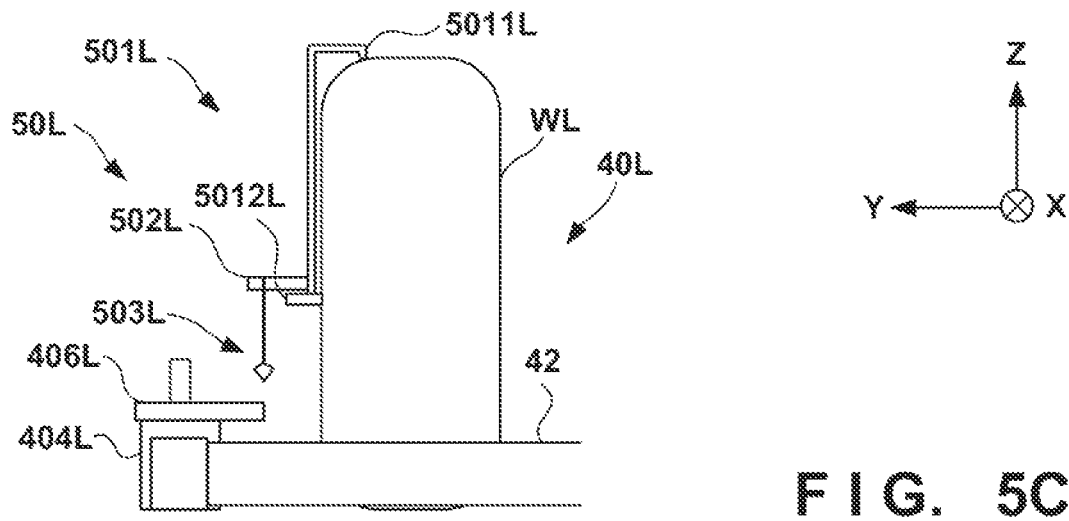
FIG. 5C is a view schematically illustrating the reference point forming unit.

FIG. 4 is a plan view illustrating a configuration example of the reference member 4. In addition, FIGS. 5A to 5C are views schematically illustrating the reference point forming unit 40L, FIG. 5A is a left side view, FIG. 5B is a plan view, and FIG. 5C is a rear view. Note that regarding the configuration that has been described for the reference point forming unit 40L, the reference point forming unit 40R can also have a corresponding configuration.

The reference member 4 (reference point setting unit) is a member provided with the reference points 400L and 400R serving as references on the vehicle V side, when the distance between the vehicle V and the target point TP is determined. In a case of being arranged with respect to the vehicle V, the reference points 400L and 400R are respectively formed to be located on the left and right exterior sides in the vehicle width direction of the vehicle V. The reference member 4 includes a set of reference point forming units 40L and 40R and a positioning unit 42.

The positioning unit 42 is a rod-shaped member that extends in the vehicle width direction with respect to the vehicle V, and can be arranged to abut both tires of the vehicle V. In the present embodiment, the positioning unit 42 is provided to connect the left and right reference point forming units 40L and 40R. For example, the positioning unit 42 may be a metal pipe, and may be connected at both end portions respectively with the base portions 402L and 402R of the set of reference point forming units 40L and 40R.

The reference point forming units 40L and 40R are a pair of members, which are attached to the positioning unit 42 so as to be located on both exterior sides of the vehicle V in a case of being arranged with respect to the vehicle V, and on which marks respectively indicating the reference points 400L and 400R are formed. In the present embodiment, the reference point forming unit 40L includes a base portion 402L, a front-and-rear direction moving portion 404L, and a vehicle width direction moving portion 406L.

The base portion 402L is a portion connected with the positioning unit 42, and is provided to extend forward the vehicle from an end portion of the positioning unit 42. The front-and-rear direction moving portion 404L is a part that moves the reference point 400L in the front-and-rear direction, and is provided to be movable in the front-and-rear direction with respect to the base portion 402L. Specifically, the front-and-rear direction moving portion 404L is provided to be slidable along the base portion 402L. The vehicle width direction moving portion 406L is a part that moves the reference point 400L in the vehicle width direction, and is provided to be movable in the vehicle width direction with respect to the front-and-rear direction moving portion 404L. With the vehicle width direction moving portions 406L and 406R, the target installation apparatus 1 can be used for a plurality of types of vehicles V having different vehicle widths.

In addition, in the present embodiment, the reference point forming unit 40L includes a scale 409L (measure) for measuring the position of the front-and-rear direction moving portion 404L with respect to the positioning unit 42. Specifically, the scale 409L is provided to be capable of reading the distance to the front-and-rear direction moving portion 404L from the tip end of the base portion 402L. In other words, the scale 409L is provided to be capable of reading a protrusion amount of the tip end portion of the base portion 402L from the front-and-rear direction moving portion 404L. With this configuration, by reading the value of the scale 409L, it is possible to grasp the position in the front-and-rear direction of the front-and-rear direction moving portion 404L with respect to the positioning unit 42.

Note that according to an aspect in which the scale 409L cannot be provided in the reference point forming unit 40L, an operator is able to measure the position of the reference point forming unit 40L with respect to the positioning unit 42 using a separate scale, a distance measuring sensor, or the like.

<Hanging Unit>

The target installation apparatus 1 includes a hanging unit 50L for aligning a wheel center WC of the tire WL with a reference point 400L. In the present embodiment, the hanging unit 50L includes an attachment portion 501L, a protrusion portion 502L, and a weight portion 503L. Note that regarding the configuration that has been described with regard to the hanging unit 50L, a hanging unit 50R can also have a corresponding configuration.

The attachment portion 501L is a member detachable from the tire WL, and in the present embodiment, is hooked on a groove of the tire WL to be attached to the tire WL. The attachment portion 501L includes a hook portion 5011L that is hooked into the tire groove, and a plate 5012L that abuts a surface, of the tire WL, facing outward in the vehicle width direction. With such a configuration, for example, the attachment portion 501L can be easily attached to the tire WL without using a fastening member, for example, a bolt, or without performing a fastening operation using a tool.

The protrusion portion 502L is provided to protrude outward in the vehicle width direction from the attachment portion 501L, in a state where the attachment portion 501L is attached to the tire WL. The weight portion 503L includes a linear member such as a wire, and a weight. One end of the linear member is connected with the protrusion portion 502L, and the other end thereof is connected with the weight. That is, the weight is configured to be hung from the protrusion portion 502L by the linear member.

<Connection Member>

Figure 6:
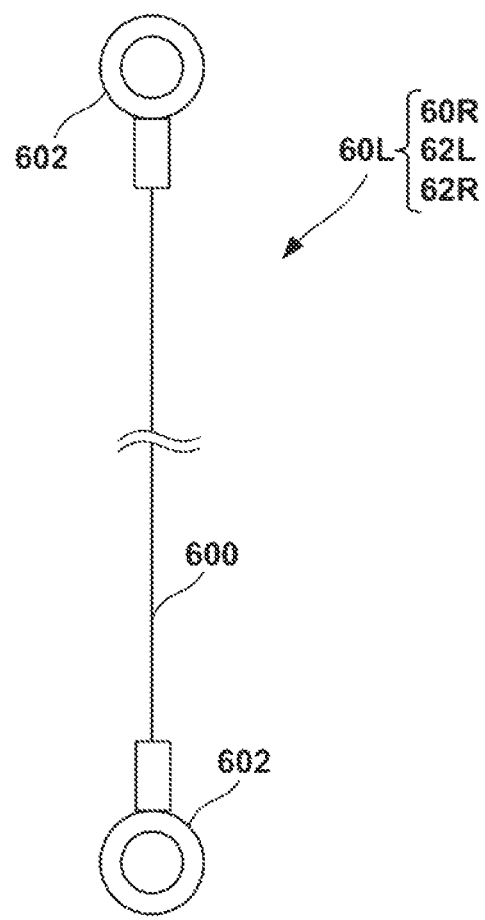
FIG. 6 is a view illustrating a configuration example of a connection member.

Reference is made to FIG. 6 together with FIG. 1. FIG. 6 is a view illustrating a configuration example of connection members 60L, 60R, 62L, and 62R. Hereinafter, regarding the configurations of the connection members 60L, 60R, 62L, and 62R, the connection member 60L will be given as an example, but the connection members 60R, 62L, and 62R each can have a similar configuration.

The connection unit 6 connects the front bar member 2 and the reference member 4 so that distances from the reference points 400L and 400R to the target point TP in the front-and-rear direction satisfy a predetermined condition. In the present embodiment, the connection unit 6 includes a pair of connection members 60L and 60R and a pair of connection members 62L and 62R that respectively connect the front bar member 2 and the reference member 4.

The connection member 60L includes a wire 600 and a fixing portion 602. The length of the wire 600 is set such that the distance from the reference point 400L to the target point TP in the front-and-rear direction satisfies a predetermined condition. In addition, the fixing portion 602 fixes the wire 600 to the front bar member 2 or the reference member 4. In the present embodiment, the fixing portion 602 has a ring shape engageable with the pin 24L. For example, the fixing portion 602 is made up of, for example, a metal member or the like. Note that another member may be appropriately used for the fixing portion 602. However, by adopting a member such as a metal member having a length that hardly changes at the time when attached, it is possible to suppress a decrease in the installation accuracy of the target. In addition, the fixing portion 602L may be detachable from the wire 600L, or may be fixed by brazing or soldering.

In the present embodiment, in a case where the reference member 4 is arranged with respect to the vehicle V, the connection members 60L and 60R respectively extend on the left and right exterior sides of the vehicle V to be parallel to the center line VC of the vehicle V extending in the front-and-rear direction, and connect the front bar member 2 and the reference member 4. In addition, in a case where the reference member 4 is arranged with respect to the vehicle V, the connection members 62L and 62R respectively extend toward the center in the vehicle width direction from the left and right exterior sides of the vehicle V, and connect the front bar member 2 and the reference member 4. Note that it is only necessary if the connection members 60L and 60R respectively extend in the front-and-rear direction on the left and right exterior sides of the vehicle V, and connect the front bar member 2 and the reference member 4. A configuration that is not parallel to the center line VC of the vehicle V can also be adopted.

The lengths of the connection members 60L and 60R will be described. The target installation apparatus 1 is for installing the target T so that a distance X1 in the front-and-rear direction between the reference points 400L and 400R on the vehicle V side and the target T satisfies a predetermined condition. However, the reference points 400L and 400R and the target point TP, and the pins 408L and 408R, to which the connection members 60L and 60R are respectively attached, and the pins 24L and 24R are respectively offset in the front-and-rear direction. Accordingly, a length X2 (=a distance from the pins 408L and 408R respectively to the pins 24L and 24R) of the connection members 60L and 60R satisfies $$X2 = X1 + X3 - X4 \quad \text{Expression (1).}$$

Here, X3 represents a distance from the target point TP to the pins 24L and 24R in the front-and-rear direction, and X4 represents a distance from the reference points 400L and 400R respectively to the pins 408L and 408R. As described above, a configuration in which the connection members 60L and 60R are not parallel to the center line VC of the vehicle V can also be adopted. However, by the connection members 60L and 60R being provided to be parallel to the center line VC, it is easily set the length corresponding to the distance between the reference points 400L and 400R and the target point TP based on Expression (1).

On the other hand, a length L1 of the connection members 62L and 62R is calculated as follows, based on a length X2 of the connection members 60L and 60R and a distance Y3 in Y direction from the center line VC of the vehicle V to the pins 408L and 408R

$$L1 = (X2^2 + Y3^2)^{1/2} \quad \text{Expression (2).}$$

Here, it is also possible to specify the target point TP by connecting the front bar member 2 and the reference member 4 using the connection members 62L and 62R, without using the connection members 60L and 60R. However, in a case where the connection members 60L and 60R are not used, the front bar member 2 may rotate about the pin 23. This rotation causes a deviation of the position of the target point TP provided to be offset in X direction with respect to the pin 23, and the target T cannot be arranged with desired accuracy, in some cases. In addition, in a case where the target point TP is located at a position also offset from the center line VC of the vehicle V in the vehicle width direction (Y direction), the influence of the deviation of the target point TP caused by the rotation of the front bar member 2 will be increased.

In the present embodiment, by using the connection members 60L and 60R to be parallel to the center line VC and the connection members 62L and 62R extending from the vehicle exterior sides to the center, it is possible to suppress the front bar member 2 from rotating around the pin 23 as a rotation axis. Specifically, relative positions of the pins 24L and 24R, spaced apart from the pin 23, to the reference member 4 are positioned by the connection members 62L and 62R, so that the rotation of the front bar member 2 around the pin 23 is suppressed. Therefore, the deviation of the target point TP can be reduced, and thus the accuracy of the position of the target point TP can be further improved.

Note that the demanded distance X1 from the reference point on the vehicle V side to the target point TP may vary depending on the type of the vehicle V or the type of the equipment to be adjusted. In such a case, the connection members 60L, 60R, 62L, and 62R each having a plurality of lengths may be prepared, and the connection members 60L, 60R, 62L, and 62R corresponding to the demanded distance X1 may be used. Accordingly, even in a case where the type of the vehicle V or the type of the equipment to be adjusted is different, it is possible to handle the difference by changing the connection members 60L, 60R, 62L, and 62R, and the front bar member 2 and the reference member 4 can be commonly used.

<Overview of Method of Using Target Installation Apparatus>

Figure 7:
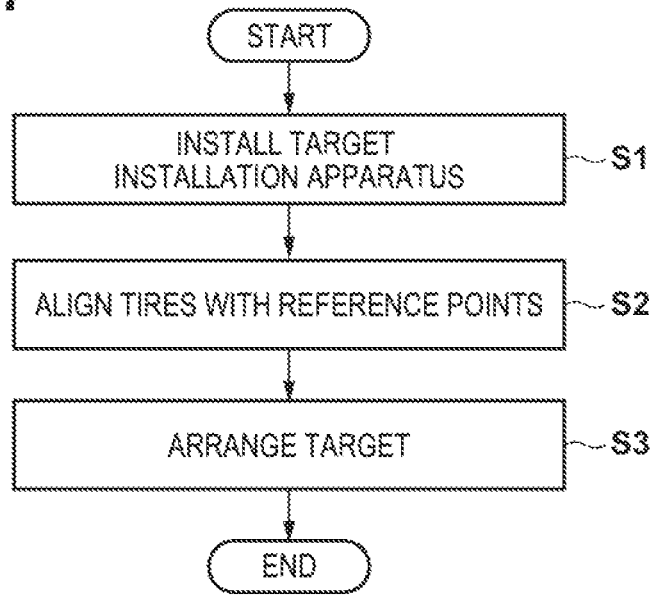
FIG. 7 is a flowchart illustrating an overview of a method of using the target installation apparatus.

Next, an overview of a method of using the target installation apparatus 1 will be described. FIG. 7 is a flowchart illustrating an overview of a method of using the target installation apparatus 1.

In S1, an operator installs the target installation apparatus 1 with respect to the vehicle V. For example, the operator installs the target installation apparatus 1 with respect to the vehicle V in the following procedure.

First, the operator inserts the reference member 4 into a bottom part of the vehicle V. More specifically, the operator inserts the reference member 4, so that in a case where the front bar member 2 and the reference member 4 are arranged with respect to the vehicle V, the reference member 4 is inserted behind the tires WL and WR to have a positional relationship in which the front bar member 2 and the reference member 4 interpose the tires WL and WR.

Next, the operator aligns the center of the reference member 4 in the width direction with the center of the vehicle V in the width direction. For example, the vehicle width direction moving portion 406L may be provided with a scale capable of measuring distances to the tires WL and WR in the vehicle width direction. Then, by adjusting the position of the positioning unit 42 in the vehicle width direction so that read values of the scales provided in the left and right vehicle width direction moving portions 406L and 406R match each other, the center of the reference member 4 in the width direction may be aligned with the center of the vehicle V in the width direction. In this manner, by aligning the center of the reference member 4 in the width direction with the center of the vehicle V in the width direction, it is possible to match the respective distances of the left and right reference points 400L and 400R with each other from the center VC of the vehicle V in the width direction.

Next, the operator connects the reference member 4 and the front bar member 2 using the connection members 60L and 60R. After that, the operator lightly pulls the front bar member 2 in a forward direction of the vehicle V to make the positioning unit 42 align and abut the tires WL and WR, and positions the reference member 4.

In S2, the operator aligns the tires WL and WR respectively with the reference points 400L and 400R in the front-and-rear direction. In the present embodiment, with the front-and-rear direction moving portions 404L and 404R, alignment of the reference points 400L and 400R respectively with the wheel centers WC of the tires WL and WR in the front-and-rear direction is enabled. For example, the operator moves the front-and-rear direction moving portions 404L and 404R so that the reference points 400L and 400R and the positions of the tip ends of the weights of the weight portions 503L and 503R are respectively coincident with each other in the front-and-rear direction.

Note that in the present embodiment, the common pin 408L for engaging the connection members 60L and 62L is provided in the front-and-rear direction moving portion 404L. Therefore, even when the front-and-rear direction moving portion 404L moves in the front-and-rear direction, the distance between the pin 408L and the reference point 400L in the front-and-rear direction is kept constant. Accordingly, the distance from the reference point 400L to the target point TP in the front-and-rear direction is also kept constant. Note that the same configuration applies to the front-and-rear direction moving portion 404R.

In S3, the operator arranges the target T. For example, the operator connects the connection members 62L and 62R with the reference member 4 and the front bar member 2. Accordingly, the position of the front bar member 2 with respect to the reference member 4 is uniquely determined. Then, the operator pulls the front bar member 2 in the forward direction of the vehicle V, and places the front bar member 2 on the ground at a stable position, and marks at a position corresponding to the target point TP. Then, the operator installs the target T at the marked position.

As described above, according to the present embodiment, the front bar member 2 and the reference member 4 are connected with each other by the connection members 60L and 60R respectively extending on the left and right exterior sides of the vehicle V and the connection members 62L and 62R respectively extending from the left and right exterior sides of the vehicle V to the center side of the vehicle V. Accordingly, the positioning accuracy of the target point TP can be further improved, and the workability at the time of installing the target T for aiming can be improved. In addition, in the present embodiment, the front bar member 2 and the reference member 4 are connected by the connection unit 6 so that the distance in the front-and-rear direction from the reference point on the vehicle V side to the target point TP satisfies a predetermined condition. Therefore, it is no longer necessary to measure the distance between the front bar member 2 and the reference member 4 in the front-and-rear direction, and the operation time can be shortened.

<Influence of Tire Arrangement on Target Installation Accuracy>

Figure 8A:
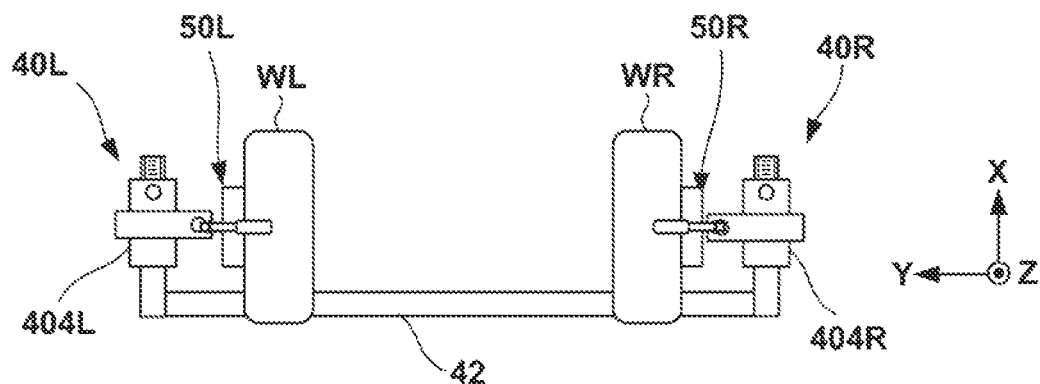
FIG. 8A is a view for describing an influence of tire arrangements on target installation accuracy.
Figure 8B:
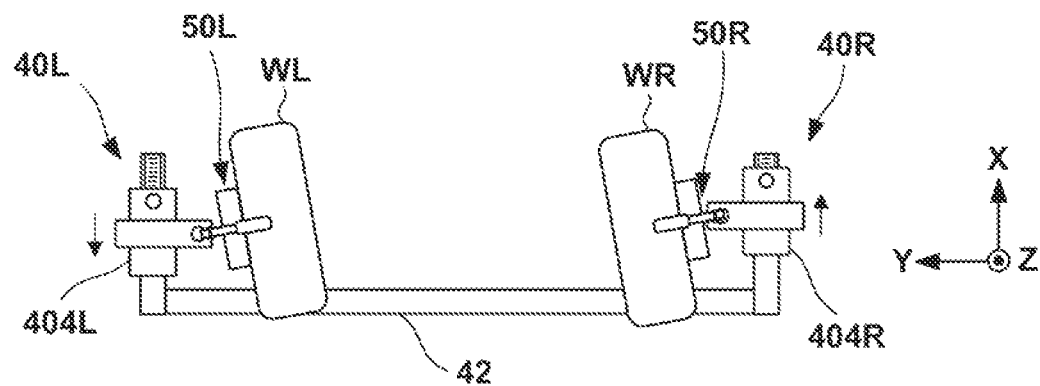
FIG. 8B is a view for describing the influence of the tire arrangements on the target installation accuracy.
Figure 8C:
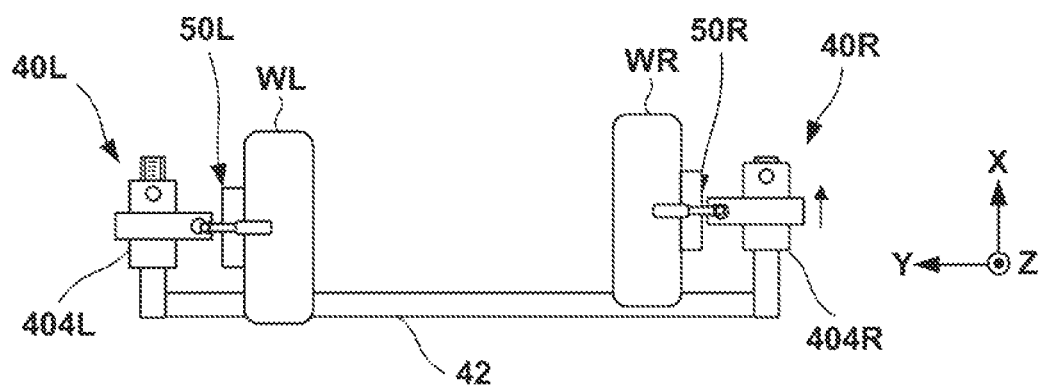
FIG. 8C is a view for describing the influence of the tire arrangements on the target installation accuracy.

FIGS. 8A to 8C are diagrams for describing influences of the arrangement of the tires WL and WR on target installation accuracy. A deviation may occur in the arrangements of the tires WL and WR based on attachment angles, attachment positions, or the like, in the process of using the vehicle V. As in the target installation apparatus 1 in the present embodiment, in the case where the reference point on the vehicle V side is determined with the tires as references, such a deviation may affect the installation accuracy of the target T.

FIG. 8A illustrates an example of a case where the deviation in the arrangements of the tires WL and WR falls within an allowable range. In such a case, by using the target installation apparatus 1 according to <Overview of Method of Using Target Installation Apparatus> described above, the target T can be arranged with desired accuracy.

On the other hand, FIG. 8B illustrates a case where the deviation occurs in the attachment angles of the tires WL and WR, as an example of the case where the deviation in the arrangements of the tires WL and WR affect the installation accuracy of the target T. More specifically, a case where the deviation occurs in toe angles of the tires WL and WR is illustrated. In this example, when the reference points 400L and 400R are respectively aligned with wheel centers WC of the tires WL and WR using the front-and-rear direction moving portions 404L and 404R, the reference points 400L and 400R are located deviating in the front-and-rear direction. Therefore, the installation position of the target T deviates from the target position (see FIG. 11). Such a deviation of the toe angles can be resulted from the attachment angles of the tires WL and WR with respect to the vehicle V, the turning state of the tires WL and WR at the time when the target installation apparatus 1 is arranged with respect to the vehicle V, or the like.

Note that, as illustrated in FIG. 8B, even when the deviation occurs in the toe angles of the tires WL and WR, as long as the deviation falls within a predetermined range, the position of the positioning unit 42 in the front-and-rear direction does not change from the case where there is no deviation in the toe angle, or falls within a range with no influence. This is because the position of the positioning unit 42 in the front-and-rear direction is determined by abutting rear-side surfaces of the tires WL and WR. However, in the actual vehicle V, the influence of deflection of the tires WL and WR or the like is dominant over the influence of the deviation of the toe angles. Note that the predetermined range of the deviation of the toe angles may fall within, for example, 40 degrees to 50 degrees, in terms of the steering angle of the steering wheel.

In addition, FIG. 8C illustrates a case (case of wheel misalignment) where a deviation occurs at the arranged positions of the tires WL and WR, as an example of the case where the deviation in the arrangements of the tires WL and WR affects the installation accuracy of the target T. Also in this example, when the reference points 400L and 400R are respectively aligned with the wheel centers WC of the tires WL and WR using the front-and-rear direction moving portions 404L and 404R, the reference points 400L and 400R are located deviating in the front-and-rear direction. Therefore, the installation position of the target T deviates from the target position. Note that the wheel misalignment can occur due to, for example, a deviation of a caster angle or a malfunction of suspension.

As described above, in a case where the tires WL, WR are in the turning state, or any of the attachment positions, angles, or the like of the tires WL and WR to the vehicle body does not fall within an allowable range, the accuracy of the installation position of the target using the target installation apparatus 1 may be affected. Therefore, in such a case, it is necessary to correctly adjust the orientations of the tires WL and WR or to detect an abnormality in the tire attachment state and stop using the target installation apparatus 1 itself. Therefore, in the present embodiment, in the installation of the target using the target installation apparatus 1, the target is installed in consideration of the deviation in the arrangements of the tires WL and WR.

<Method for Installing Target in Consideration of Deviation in Tire Arrangement>

FIG. 9 is a flowchart illustrating an example of a target installation method using the target installation apparatus 1, and illustrates a method in consideration of the deviation in the arrangements of the tires WL and WR.

In S10, whether uneven wear of the tires WL and WR falls within an allowable range is checked. In a case where the uneven wear falls within the allowable range, the process proceeds to S11, and in a case where it does not fall within the allowable range, the process proceeds to S18. In a case where there is a large deviation in the arrangements of the tires WL and WR, that is, in a case where the alignment of the tires WL and WR is not normal, the uneven wear may occur in the tires WL and WR. As an example, in a case where there is a large deviation in a camber angle, the wear of the tires WL and WR is imbalanced in the vehicle width direction, in some cases. In the present embodiment, by checking the state of the uneven wear of the tires WL and WR, it can be understood that the deviation occurs at the positions of the tires WL and WR to an extent that the processes of S11 to S17 cannot be performed.

Here, when the process proceeds to S18, alignment of the tires WL and WR is conducted. That is, in a case where it is determined that the deviation in the arrangements of the tires WL and WR does not fall within the allowable range (the alignment is not normal), the alignment of the tires WL and WR is conducted. After the alignment of the tires WL and WR is conducted, the process returns to S10, and the target T is installed using the target installation apparatus 1 in steps S11 to S17 to be described later.

In S11, a steering wheel SW is set to a neutral state. For example, the operator operates the steering wheel SW to adjust the rotation angle (spoke angle) of the steering wheel SW to be neutral on appearance.

In S12, the target installation apparatus 1 is arranged with respect to the vehicle V. FIG. 10A illustrates a state in which the target installation apparatus 1 is arranged with respect to the vehicle V. For example, the present step can be a step similar to S1 in FIG. 7. When viewed from a certain aspect, the present step is an arrangement step of arranging the reference member 4 as the reference point setting unit with respect to the vehicle V.

In S13, with the front-and-rear direction moving portions 404L and 404R, the tires WL and WR and the reference points 400L and 400R are respectively aligned with each other. FIG. 10B illustrates a state after the tires WL and WR are respectively aligned with the reference points 400L and 400R. For example, the present step can be a step similar to S2 in FIG. 7. When viewed from a certain aspect, the present step is an alignment step of respectively aligning the center positions of the tires WL and WR with the positions of the reference points 400L and 400R in the front-and-rear direction, by moving the front-and-rear direction moving portions 404L and 404R.

Figure 11:
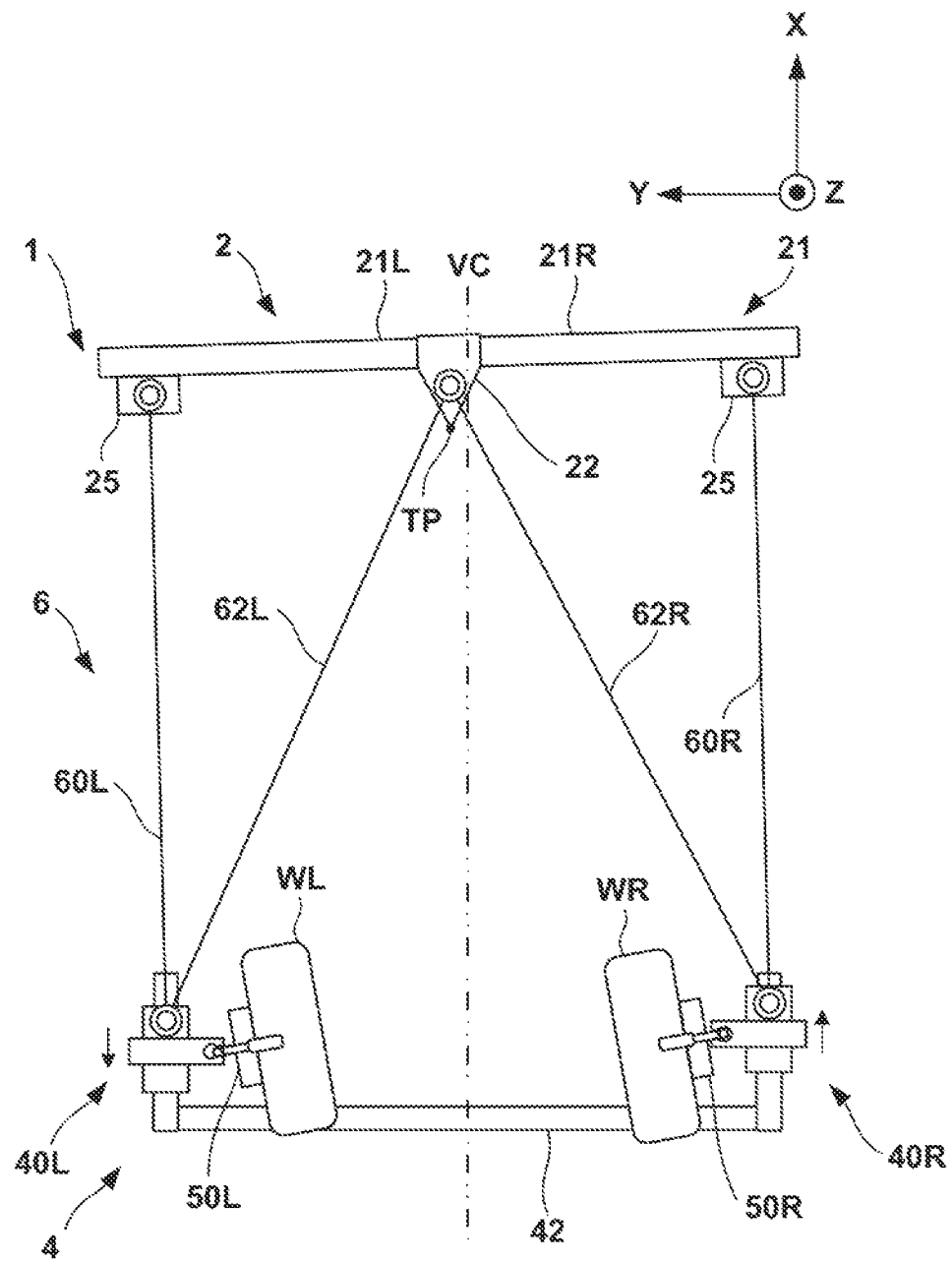
FIG. 11 is a view illustrating a state in which a target point TP deviates from a desired position.

In S14, whether a left-right difference in the positions of the reference points 400L and 400R in the front-and-rear direction falls within an allowable range is checked. In a case where the difference falls within the allowable range, the process proceeds to S17, and in a case where the difference does not fall within the allowable range, the process proceeds to S15. As illustrated in FIG. 10B, in a case where the deviation occurs in the arrangements of the tires WL and WR, the left-right difference may occur at the positions in the front-and-rear direction of the reference points 400L and 400R, as a result of the alignment in S13. When the target T is installed in a state in which the left-right difference occurs between the positions of the reference points 400L and 400R in the front-and-rear direction, the position of the target T deviates in the width direction from the center line VC of the vehicle V. For example, FIG. 11 illustrates a state in which the target point TP deviates from a desired position, and illustrates a state in which the connection members 62L and 62R are connected with the reference member 4 and the front bar member 2 from the state illustrated in FIG. 10B, and the position of the front bar member 2 with respect to the reference member 4 is determined. In this example, the left-right difference is generated between the positions of the reference points 400L and 400R in the front-and-rear direction, and causes the position of the target point TP to deviate to the left side.

However, in a case where the deviation in the installation angle of the radar V1 resulted from the deviation in the width direction of the target T falls within a range that is correctable in accordance with an actual traveling state using a self-learning function of the radar V1, the target T can be installed without conducting the adjustment in S15 to be described later (S17). Therefore, in the present embodiment, the allowable range of the left-right difference at the positions of the reference points 400L and 400R in the front-and-rear direction is set to a value that falls within the accuracy demanded for a service operation as a range that is correctable by the self-learning function (for example, within ±5 mm with respect to a left-right fluctuation width of the marking position, further within less than 4 mm in the difference in positions in the front-and-rear direction between the left and right reference points 400L and 400R). However, the allowable range can be appropriately changed in accordance with the configuration of the vehicle V or the equipment to be aimed at. In addition, in a case where the equipment to be aimed at does not have the self-learning function, another correction function, or the like, the allowable range of the left-right difference may be set at the positions of the reference points 400L and 400R in the front-and-rear direction so that the position of the target T in the width direction falls within an allowable error. In addition, the allowable range may be determined based on the type of the vehicle V, the distances between the weight portions 503L and 503R and the tires WL and WR in the vehicle width direction, or the like.

In S15, angle adjustments of the tires WL and WR are conducted. In the present embodiment, the angles of the tires WL and WR are adjusted by operating the steering wheel SW of the vehicle V so that the positional relationship between the reference points 400L and 400R in the front-and-rear direction satisfies a predetermined condition. Examples of the predetermined condition here include the positions of the left and right reference points 400L and 400R in the front-and-rear direction being coincident with each other, or a difference between these positions falling within a predetermined value (for example, within 1 mm to 3 mm). For example, in a case where the deviation in the positions of the left and right reference points 400L and 400R in the front-and-rear direction is 5 mm, the angles of the tires WL and WR are adjusted so that the left and right reference points 400L and 400R each move by 2.5 mm, which is ½ of the deviation. In other words, the adjustments are conducted so that the left and right toe angles are equally distributed. In the present embodiment, the scales 409L and 409R are provided. Therefore, for example, the angle adjustments of the tires WL and WR can be conducted so that the read values of the left and right scales 409L and 409R become the same values. Note that in a case where the attachment positions and the attachment angles of the tires WL and WR vary largely and the predetermined condition is not satisfied even when the steering wheel SW is operated, the process can proceed to S18.

In S16, it is checked whether the operation amount of the steering wheel SW in the angle adjustments of the tires WL and WR in S15 falls within a threshold, and in a case where the operation amount falls within the threshold, the process proceeds to S17. In a case where the operation amount of the steering wheel SW does not fall within the threshold, the process proceeds to S18, and the alignment of the tires WL and WR is conducted. The operation amount of the steering wheel SW can be, for example, a rotation angle from the neutral state of the steering wheel SW. As an example, the rotation angle of 40 degrees to 50 degrees of the steering wheel SW may be set as the threshold.

In the example illustrated in FIG. 11, the deviation of the toe angles to the same side with respect to the traveling direction occurs in the left and right tires WL and WR, and the positions of the left and right reference points 400L and 400R in the front-and-rear direction can be aligned by operating the steering wheel SW. However, in the actual vehicle V, there is a possibility that the deviations of the toe angle, the caster angle, or the camber angle occur in a complex manner, and the rotation angle of the steering wheel SW becomes relatively large in the adjustments of the positions in the front-and-rear direction of the left and right reference points 400L and 400R, in some cases. For example, when the rotation angle of the steering wheel SW exceeds 40 degrees to 50 degrees, the positioning unit 42 that has been installed may move due to angle changes of the left and right tires WL and WR. Hence, the target T cannot be installed with desired accuracy, in some cases. Even in a case where the steering wheel SW is used, the difference between the positions of the left and right reference points 400L and 400R in the front-and-rear direction cannot fall within a predetermined value, in some cases. Therefore, in the present embodiment, in a case where the operation amount of the steering wheel SW exceeds the threshold (S16: No), the alignment of the tires WL and WR is conducted (S18).

Figure 12A:
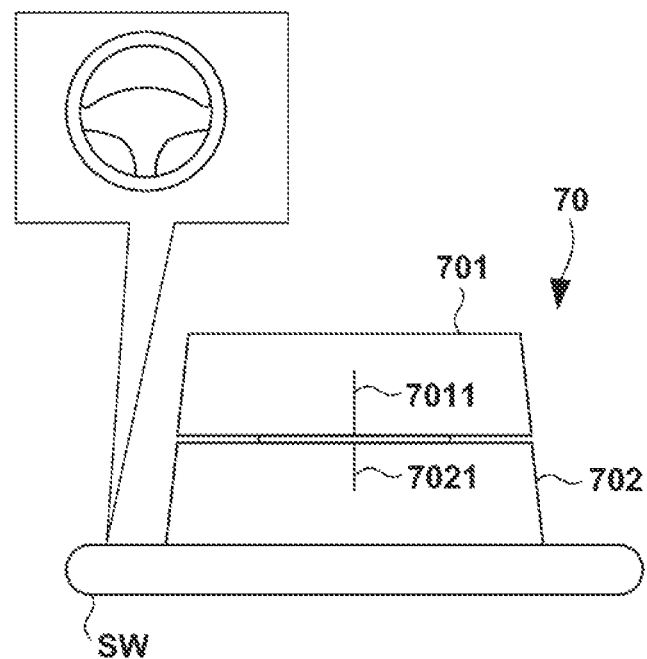
FIG. 12A is a view illustrating a method for checking a rotation angle of a steering wheel SW.
Figure 12B:
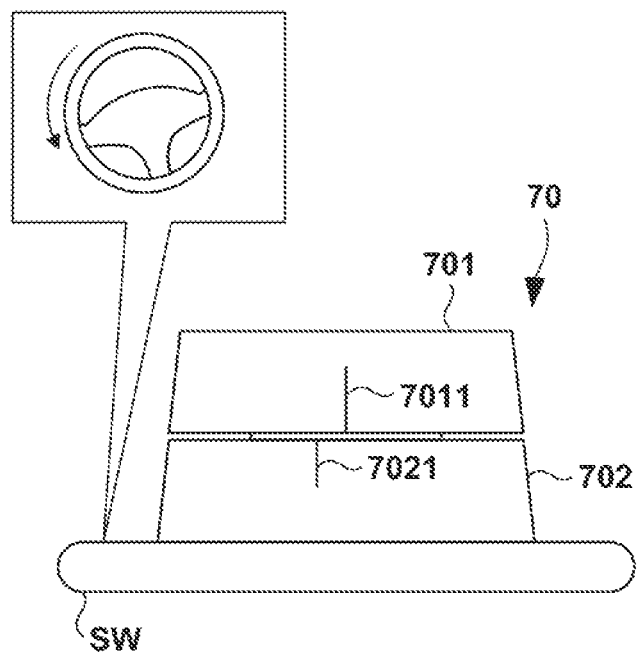
FIG. 12B is a view illustrating a method for checking the rotation angle of the steering wheel SW.

FIGS. 12A and 12B are diagrams each illustrating a method for checking the rotation angle of the steering wheel SW. FIG. 12A is a plan view of the steering wheel SW and its periphery, and illustrates a case where the steering wheel SW is in a neutral state. FIG. 12B is a plan view of the steering wheel SW and its periphery, and illustrates a case where the steering wheel SW is in a state where the angle adjustments of the tires WL and WR has been conducted. In the present embodiment, marks 7011 and 7021 are respectively attached to the fixed portion 701 and the movable portion 702 of an attachment portion 70 of the steering wheel SW. Then, the marks 7011 and 7021 are provided to be coincident with each other in the width direction in the neutral state of the steering wheel SW (FIG. 12A). When the steering wheel SW is rotated, a deviation occurs between the marks 7011 and 7021 by the amount of the rotation (FIG. 12B). Therefore, the rotation angle of the steering wheel SW can be obtained, based on the relationship between the deviation amount and the rotation angle of the steering wheel SW. Therefore, not only the value of the rotation angle (degrees) itself but also the deviation amount (mm) and the like can be adopted as the threshold of the operation amount of the steering wheel SW in S16.

In addition, a mode of acquiring the rotation angle of the steering wheel SW is not limited to this. For example, an analog or digital angle meter may be installed on the steering wheel SW to measure the rotation angle of the steering wheel SW. In addition, a read value or the like of a steering angle sensor of the steering wheel SW included in the vehicle V may be acquired.

In S17, the target T is installed. For example, the present step can be a step similar to S3 in FIG. 7. The present step is performed in the case where the process proceeds to Yes at the branch of S16. Hence, when viewed from a certain aspect, the present step is an installation step of installing the target T, in a case where, in the adjustment step, the operation amount of the steering wheel SW from the neutral state is equal to or less than the threshold.

As described above, according to the present embodiment, in a case where the target T for aiming is installed with the tires WL and WR as references, the angle adjustments of the tires WL and WR can be conducted (S15). Therefore, it is possible to improve the installation accuracy of the target for aiming.

In addition, when a deviation occurs in the arrangements of the tires WL and WR, it is conceivable that the tires WL and WR are aligned and then the target T for aiming is installed using the target installation apparatus 1. However, the deviation in the arrangements of the tires WL and WR affects the installation accuracy of the target T using the target installation apparatus 1, but falls within an allowable range for the vehicle V, in some cases. For example, in a case where the degree of skew caused by the deviation in the arrangements of the tires WL and WR falls within a range that is correctable by the learning function or the like, it can be said that the deviation falls within the allowable range for the vehicle V. Even in such a case, when the target T is installed using the target installation apparatus 1 after the tires WL and WR are aligned, it takes time to install the target T, and the work efficiency may decrease.

According to the present embodiment, in a case where there is a difference in the positions in the front-and-rear direction between the left and right reference points 400L and 400R, and in a case where the deviation occurs in the arrangements of the tires WL and WR, the angles of the tires WL and WR are adjusted (S14 to S15). Then, in a case where the operation amount of the steering wheel SW at that time is equal to or less than a threshold, the target T is installed (S16 to S17). Therefore, it is possible to suppress a decrease in work efficiency.

Further, according to the present embodiment, it is possible to check whether the deviation in the arrangements of the tires WL and WR necessitates the alignment of the tires WL and WR using the target installation apparatus 1. That is, the target installation apparatus 1 can also have a function of detecting the necessity of the alignment of the tires WL and WR.

Another Embodiment

In the description of the above embodiments, the illustrations have been given with regard to the installation method of the case where the target T for aiming the equipment provided in the front part of the vehicle V is installed ahead the vehicle V for the vehicle V of front wheel steering. However, the target installation apparatus 1 is also applicable to a case where the target T for aiming the equipment provided in the rear part of the vehicle is installed behind the vehicle V of, for example, a four-wheel steering vehicle or a rear-wheel steering vehicle such as a forklift.

Note that in the above embodiments, the front-and-rear direction moving portion 404L slides along the base portion 402L to move in the front-and-rear direction, and the vehicle width direction moving portion 406L slides along the front-and-rear direction moving portion 404L to move in the vehicle width direction. However, the reference point forming units 40L and 40R are not limited to the above configuration, and the positions of the reference points 400L and 400R can be adjustable in a known method. In addition, the reference point forming units 40L and 40R may include restriction mechanisms that respectively restrict movements of the front-and-rear direction moving portions 404L and 404R and the vehicle width direction moving portions 406L and 406R, after the position adjustments with those portions. Accordingly, it is possible to prevent the reference point from deviating after the adjustments.

Summary of Embodiments

The above embodiments disclose at least a target installation apparatus and a target installation method using the same in the following.

1. A target installation apparatus in the above embodiments is a target installation apparatus (1) for installing a target for aiming equipment mounted on a vehicle, the target installation apparatus (1) including:
- a reference point setting unit (4), in a case of being arranged with respect to the vehicle (V), configured to set vehicle-side reference points (400L, 400R) on both exterior sides in a vehicle width direction of the vehicle, in which
- the reference point setting unit includes:
- a rod-shaped member (42) that extends in the vehicle width direction with respect to the vehicle and that is arrangeable to abut both tires of the vehicle; and
- a pair of reference point forming units (40L, 40R) that are attached to the rod-shaped member to be positioned on both the exterior sides of the vehicle in the case of being arranged with respect to the vehicle, and that include marks formed to respectively indicate the reference points, and in which
- the pair of reference point forming units respectively include moving portions (404L, 404R) that move the reference points in a front-and-rear direction of the vehicle while being arranged with respect to the vehicle.

According to this embodiment, it is possible to adjust the angles of the tires in a case of installing the target for aiming with the tires as references. Therefore, it is possible to improve the installation accuracy of the target for aiming.

2. According to the above embodiments,
- the target installation apparatus further includes hanging units (50L, 50R) respectively attachable to the tires and hung from the tires.

According to this embodiment, by aligning the hanging units with the reference points on the vehicle side, the accuracy of position adjustment in the front-and-rear direction on the vehicle side can be improved.

3. According to the above embodiments,
- the reference point setting unit includes scales (409L, 409R) for respectively measuring positions of the moving portions with respect to the rod-shaped member.

According to this embodiment, the positions of the moving portions can be measured, and the angle adjustments of the tires can be more easily conducted.

4. According to the above embodiments,
- the target installation apparatus further includes:
- a target setting unit (2) that is arrangeable ahead the vehicle to extend over the vehicle width direction of the vehicle and that includes a target point provided to indicate an installation position of the target; and
- a connection unit (6) configured to connect the reference point setting unit and the target setting unit to be spaced apart from each other by a predetermined distance.

According to this embodiment, it is possible to set the installation position of the target for aiming at a position that satisfies a predetermined condition with respect to the reference points on the vehicle side.

5. According to the above embodiments,
- the connection unit includes:
- a set of first connection members (60L, 60R) configured to connect the reference point setting unit and the target setting unit respectively on both the exterior sides of the vehicle, in a case where the reference point setting unit is arranged with respect to the vehicle; and
- a set of second connection members (62L, 62R) that respectively extend from both the exterior sides of the vehicle toward a center in the vehicle width direction to connect the reference point setting unit and the target setting unit, in the case where the reference point setting unit is arranged with respect to the vehicle.

According to this embodiment, the target setting unit and the reference point setting unit are connected by the first connection member and the second connection member that extend on exterior sides of the vehicle. Accordingly, the positioning accuracy of the target point can be further improved, and the workability at the time of installing the target for aiming can be improved.

6. A target installation method in the above embodiments includes:
- an arrangement step (S12) of arranging the reference point setting unit with respect to the vehicle;
- an alignment step (S13) of aligning center positions of tires with positions of reference points in a front-and-rear direction, by moving the moving portions; and
- an adjustment step (S15) of adjusting angles of the tires by operating a steering wheel of the vehicle such that a positional relationship of the reference points in the front-and-rear direction satisfies a predetermined condition.

According to this embodiment, the angles of the tires are adjusted, in a case where the target for aiming is installed with the tires as references. Therefore, it is possible to improve the installation accuracy of the target for aiming.

7. According to the above embodiments,
- the method further includes an installation step (S17) of installing the target, in a case where an operation amount of the steering wheel from a neutral state in the adjustment step is equal to or less than a threshold.

According to this embodiment, the target can be installed, in a case where the attachment angles of the tires each fall within an allowable range.

8. According to the above embodiments,
- the method further includes an alignment step (S18) of aligning the tires, in a case where the operation amount of the steering wheel from the neutral state in the adjustment step exceeds the threshold.

According to this embodiment, in a case where the attachment angle of the tire exceeds the allowable range, after the alignment is conducted, the target for aiming can be set.

The invention is not limited to the foregoing embodiments, and various variations/changes are possible within the spirit of the invention.

What is claimed is:

1. A target installation apparatus for installing a target for aiming equipment mounted on a vehicle, the target installation apparatus comprising:
- a reference point setting unit, in a case of being arranged with respect to the vehicle, configured to set vehicle-side reference points on both exterior sides in a vehicle width direction of the vehicle, wherein
- the reference point setting unit includes:
- a rod-shaped member that extends in the vehicle width direction with respect to the vehicle and that is arrangeable to abut both tires of the vehicle; and
- a pair of reference point forming units that are attached to the rod-shaped member to be positioned on both the exterior sides of the vehicle in the case of being arranged with respect to the vehicle and that include marks formed to respectively indicate the reference points, and wherein
- the pair of reference point forming units, respectively include moving portions that move the reference points in a front-and-rear direction of the vehicle while being arranged with respect to the vehicle, and the reference point setting unit includes scales for respectively measuring positions of the moving portions with respect to the rod-shaped member.

2. The target installation apparatus according to claim 1, further comprising
hanging units respectively attachable to the tires and hung from the tires.

3. The target installation apparatus according to claim 1, further comprising:
a target setting unit that is arrangeable ahead the vehicle to extend over the vehicle width direction of the vehicle and that includes a target point provided to indicate an installation position of the target; and
a connection unit configured to connect the reference point setting unit and the target setting unit to be spaced apart from each other by a predetermined distance.

4. The target installation apparatus according to claim 3, wherein
the connection unit includes:
a set of first connection members configured to connect the reference point setting unit and the target setting unit respectively on both the exterior sides of the vehicle, in a case where the reference point setting unit is arranged with respect to the vehicle; and
a set of second connection members that respectively extend from both the exterior sides of the vehicle toward a center in the vehicle width direction to connect the reference point setting unit and the target setting unit, in the case where the reference point setting unit is arranged with respect to the vehicle.

5. A target installation method using the target installation apparatus of claim 1, the target installation method comprising:
arranging the reference point setting unit with respect to the vehicle;
aligning center positions of the tires with positions of the reference points in the front-and-rear direction, by moving the moving portions; and
adjusting angles of the tires by operating a steering wheel of the vehicle such that a positional relationship of the reference points in the front-and-rear direction satisfies a predetermined condition.

6. The target installation method according to claim 5, further comprising
installing the target, in a case where an operation amount of the steering wheel from a neutral state in the adjusting is equal to or less than a threshold.

7. The target installation method according to claim 6, further comprising
aligning the tires, in a case where the operation amount of the steering wheel from the neutral state in the adjusting exceeds the threshold.

8. A target installation apparatus for installing a target for aiming equipment mounted on a vehicle, the target installation apparatus comprising:
a reference point setting unit, in a case of being arranged with respect to the vehicle, configured to set vehicle-side reference points on both exterior sides in a vehicle width direction of the vehicle, wherein
the reference point setting unit includes:
a rod-shaped member that extends in the vehicle width direction with respect to the vehicle and that is arrangeable to abut both tires of the vehicle; and
a pair of reference point forming units that are attached to the rod-shaped member to be positioned on both the exterior sides of the vehicle in the case of being arranged with respect to the vehicle and that include marks formed to respectively indicate the reference points, and wherein
the pair of reference point forming units, respectively include moving portions that move the reference points in a front-and-rear direction of the vehicle while being arranged with respect to the vehicle,
wherein the target installation apparatus further comprises:
a target setting unit that is arrangeable ahead the vehicle to extend over the vehicle width direction of the vehicle and that includes a target point provided to indicate an installation position of the target; and
a connection unit configured to connect the reference point setting unit and the target setting unit to be spaced apart from each other by a predetermined distance.

9. The target installation apparatus according to claim 8, wherein
the connection unit includes:
a set of first connection members configured to connect the reference point setting unit and the target setting unit respectively on both the exterior sides of the vehicle, in a case where the reference point setting unit is arranged with respect to the vehicle; and
a set of second connection members that respectively extend from both the exterior sides of the vehicle toward a center in the vehicle width direction to connect the reference point setting unit and the target setting unit, in the case where the reference point setting unit is arranged with respect to the vehicle.

* * * * *